(12) United States Patent
Dudzinski et al.

(10) Patent No.: US 11,258,660 B2
(45) Date of Patent: Feb. 22, 2022

(54) CONFIGURING THE ZONE SERVED BY A BASE STATION PROVIDING WIRELESS COMMUNICATION

(71) Applicant: AIRSPAN IP HOLDCO LLC, Boca Raton, FL (US)

(72) Inventors: Krzysztof Dudzinski, Langley (GB); Marlon Peter Persaud, Beaconsfield (GB); Andrew Logothetis, High Wycombe (GB); Venkateswarlu Katepalli, Slough (GB); Ashvtosh Goel, Slough (GB)

(73) Assignee: AIRSPAN IP HOLDCO LLC, Boca Raton, FL (US)

( * ) Notice: Subject to any disclaimer, the term of this patent is extended or adjusted under 35 U.S.C. 154(b) by 0 days.

(21) Appl. No.: 16/836,711

(22) Filed: Mar. 31, 2020

(65) Prior Publication Data

US 2020/0328801 A1 Oct. 15, 2020

(30) Foreign Application Priority Data

Apr. 12, 2019 (GB) ...................................... 1905222
Oct. 17, 2019 (GB) ...................................... 1915024

(51) Int. Cl.
*H04B 7/185* (2006.01)
*H04L 41/0803* (2022.01)
(Continued)

(52) U.S. Cl.
CPC ..... *H04L 41/0803* (2013.01); *H04B 7/18504* (2013.01); *H04B 7/18506* (2013.01);
(Continued)

(58) Field of Classification Search
CPC ..... H04W 4/38; H04W 24/10; H04W 84/005; H04W 8/08; H04W 16/10; H04W 24/00;
(Continued)

(56) References Cited

U.S. PATENT DOCUMENTS 6,211,926 B1 4/2001 Won
7,180,876 B1 2/2007 Henry et al.
(Continued)

FOREIGN PATENT DOCUMENTS

EP 2373111 A1 10/2011
EP 2991403 A2 3/2016
(Continued)

OTHER PUBLICATIONS

GB Search Report from GB2003024.3 dated Nov. 13, 2020, 4 pages.
(Continued)

*Primary Examiner* — Khalid W Shaheed
(74) *Attorney, Agent, or Firm* — Andrew Dunlap; Haynes Beffel & Wolfeld LLP

(57) ABSTRACT

Methods and apparatuses for configuring the zone served by a base station providing wireless communication for a plurality of user equipment located in moving vehicles are disclosed. Motion reports are received from the user equipment, indicating a current location, a current direction of motion, and a current speed of the moving vehicles. The motion reports are received from at least one of: user equipment currently using the base station for wireless communication; user equipment currently within the zone served by the base station, but not using the base station for wireless communication; and/or user equipment currently using at least one neighbouring base station to the base station for wireless communication. A configuration for the zone served by the base station is then determined, based on the motion reports and on locations of the base station and of the at least one neighbouring base station. The configuration for the zone served by the base station is then applied to the base station.

20 Claims, 9 Drawing Sheets

Figure 1:
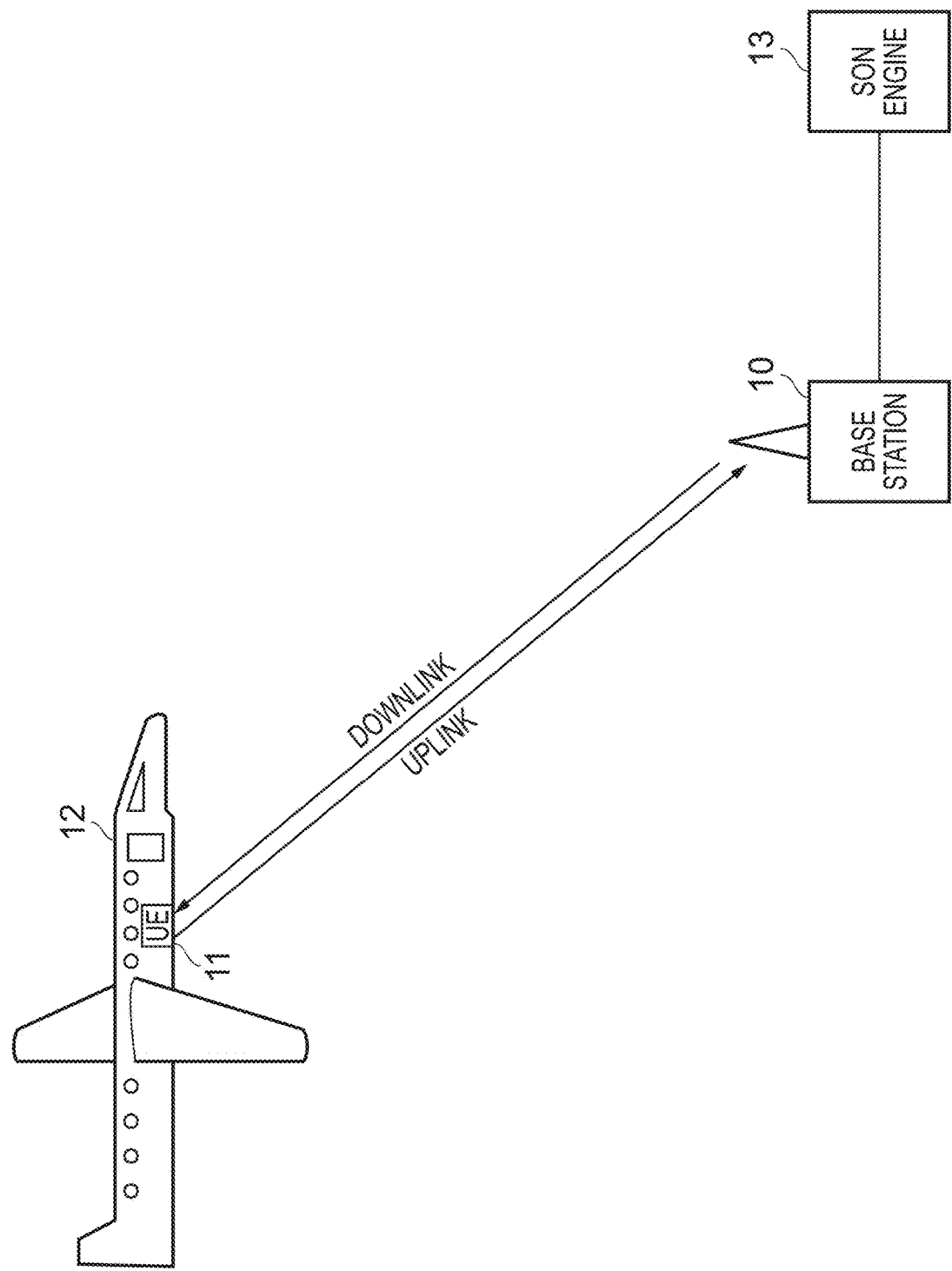

(51) Int. Cl.
| | |
|---|---|
| *H04B 17/10* | (2015.01) |
| *H04B 17/12* | (2015.01) |
| *H04B 17/18* | (2015.01) |
| *H04W 16/10* | (2009.01) |
| *H04W 72/04* | (2009.01) |
| *H04W 72/08* | (2009.01) |
| *H04W 24/02* | (2009.01) |
| *H04W 24/10* | (2009.01) |
| *H04W 76/10* | (2018.01) |
| *H04L 5/00* | (2006.01) |

(52) U.S. Cl.
CPC .......... *H04B 17/101* (2015.01); *H04B 17/12* (2015.01); *H04B 17/18* (2015.01); *H04L 5/001* (2013.01); *H04W 16/10* (2013.01); *H04W 24/02* (2013.01); *H04W 24/10* (2013.01); *H04W 72/042* (2013.01); *H04W 72/0453* (2013.01); *H04W 72/082* (2013.01); *H04W 72/085* (2013.01); *H04W 76/10* (2018.02)

(58) Field of Classification Search
CPC ..... H04W 24/02; H04W 36/30; H04W 36/32; H04W 4/42
See application file for complete search history.

(56) References Cited

U.S. PATENT DOCUMENTS

| | | | |
|---|---|---|---|
| 10,085,266 | B1 | 9/2018 | Pawar et al. |
| 10,693,557 | B1 | 6/2020 | Ayotte |
| 2006/0229104 | A1 | 10/2006 | de La Chapelle et al. |
| 2007/0165526 | A1 | 7/2007 | Lee |
| 2009/0047971 | A1 | 2/2009 | Fu |
| 2009/0096857 | A1 | 4/2009 | Frisco et al. |
| 2009/0191877 | A1 | 7/2009 | Jang et al. |
| 2009/0221302 | A1* | 9/2009 | Luiro ................. H04W 8/30 455/456.6 |
| 2009/0264128 | A1 | 10/2009 | Tomisawa |
| 2009/0318138 | A1 | 12/2009 | Zeng et al. |
| 2010/0197317 | A1 | 8/2010 | Sadek et al. |
| 2010/0329200 | A1 | 12/2010 | Chen et al. |
| 2011/0026476 | A1 | 2/2011 | Lee et al. |
| 2012/0042345 | A1 | 2/2012 | Tjio et al. |
| 2012/0263117 | A1 | 10/2012 | Love et al. |
| 2013/0109401 | A1 | 5/2013 | Ma et al. |
| 2013/0182655 | A1 | 7/2013 | Das et al. |
| 2014/0086155 | A1 | 3/2014 | Chen |
| 2014/0094165 | A1 | 4/2014 | Karlsson et al. |
| 2014/0126498 | A1 | 5/2014 | Koorapaty et al. |
| 2015/0050941 | A1 | 2/2015 | Sawada et al. |
| 2015/0172987 | A1 | 6/2015 | Balakrishnan et al. |
| 2015/0245218 | A1 | 8/2015 | Hassan et al. |
| 2015/0256314 | A1 | 9/2015 | Gauvreau et al. |
| 2015/0341945 | A1 | 11/2015 | Panchal |
| 2016/0014657 | A1 | 1/2016 | Le et al. |
| 2017/0048863 | A1* | 2/2017 | Tsai ................. H04W 76/27 |
| 2018/0014269 | A1 | 1/2018 | Lauer et al. |
| 2018/0035416 | A1 | 2/2018 | Yi et al. |
| 2018/0063736 | A1* | 3/2018 | Sadeghi ............. H04W 24/10 |
| 2018/0070280 | A1* | 3/2018 | Nittala ............... H04W 24/10 |
| 2018/0084562 | A1 | 3/2018 | Ramamurthi et al. |
| 2018/0192327 | A1 | 7/2018 | Gaydos et al. |
| 2018/0206133 | A1 | 7/2018 | Venkatraman et al. |
| 2019/0281441 | A1* | 9/2019 | Huang ............... H04W 72/042 |
| 2019/0319723 | A1 | 10/2019 | Axmon et al. |
| 2019/0327631 | A1* | 10/2019 | Huang ................. H04W 8/08 |
| 2020/0092685 | A1* | 3/2020 | Bach .................. H04B 7/2606 |

FOREIGN PATENT DOCUMENTS

| | | |
|---|---|---|
| EP | 3062446 A1 | 8/2016 |
| EP | 3167654 A1 | 5/2017 |
| EP | 3346784 A1 | 7/2018 |
| EP | 3387861 A1 | 10/2018 |
| WO | 2016007295 A1 | 1/2016 |
| WO | 2017097997 A1 | 6/2017 |

OTHER PUBLICATIONS

U.S. Office Action in U.S. Appl. No. 16/827,970 dated Sep. 28, 2020, 49 pages.
EP Search Report from EP20166798.7 dated Aug. 28, 2020, 8 pages.
EP Search Report from EP20166810.0 dated Sep. 1, 2020, 7 pages.
GB Search Report from GB1915033.3 dated Apr. 1, 2020, 4 pages.
GB Search Report from GB2003168.8 dated Aug. 5, 2020, 5 pages.
Dictionary.com definition for "configuration", Jan. 5, 2021, 1 page.
U.S. Office Action in U.S. Appl. No. 16/827,970 dated Jan. 13, 2021, 60 pages.
U.S. Office Action in U.S. Appl. No. 16/828,821 dated Nov. 29, 2021, 10 pages.
U.S. Office Action in U.S. Appl. No. 16/836,638 dated Oct. 29, 2021, 17 pages.

* cited by examiner

CONFIGURING THE ZONE SERVED BY A BASE STATION PROVIDING WIRELESS COMMUNICATION

The present techniques relate to the provision of a wireless network and more particularly to the configuration of the zone served by a base station forming part of that wireless network.

Wireless communication for mobile user equipment can be provided by arranging a network of base stations with which user equipment wirelessly communicates. For example, contemporary wireless networks may be configured in accordance with the Long-Term Evolution (LTE) standard. The base stations of this network each has an associated zone which it serves, where there may be some overlap between the zones provided by adjacent base stations, such that user equipment may connect to the wireless network anywhere within the full area covered by the wireless network. Generally it may be sought to avoid too great an overlap in the zones served by two base stations due to the inherent redundancy and furthermore for the increased potential for interference between the wireless communications carried out with respect to each base station, whilst nevertheless wishing to ensure that seamless coverage is provided for the user equipment. This generally will allow the mobile user equipment a free range of movement within the full area covered by the wireless network whilst still supporting wireless communication with each item of user equipment regardless of its specific location.

At least some examples provide a method of configuring the zone served by a base station providing wireless communication for a plurality of user equipment located in moving vehicles, the method comprising: receiving motion reports from the plurality of user equipment, wherein the motion reports indicate a current location, a current direction of motion, and a current speed of the moving vehicles, wherein the motion reports are received from at least one of: user equipment currently using the base station for wireless communication; user equipment currently within the zone served by the base station, but not using the base station for wireless communication; and/or user equipment currently using at least one neighbouring base station to the base station for wireless communication; determining, based on the motion reports and on locations of the base station and of the at least one neighbouring base station, a configuration for the zone served by the base station; and applying the configuration for the zone served by the base station.

At least some examples provide an apparatus for configuring the zone served by a base station providing wireless communication for a plurality of user equipment located in moving vehicles, the apparatus comprising: reception circuitry to receive motion reports from the plurality of user equipment, wherein the motion reports indicate a current location, a current direction of motion, and a current speed of the moving vehicles, wherein the motion reports are received from at least one of: user equipment currently using the base station for wireless communication; user equipment currently within the zone served by the base station, but not using the base station for wireless communication; and/or user equipment currently using at least one neighbouring base station to the base station for wireless communication; calculation circuitry to determine, based on the motion reports received by the reception circuitry and on locations of the base station and of the at least one neighbouring base station, a configuration for the zone served by the base station; and transmission circuitry to transmit the configuration for the zone served by the base station to the base station for application by the base station.

At least some example provide an apparatus for configuring the zone served by a base station providing wireless communication for a plurality of user equipment located in moving vehicles, the apparatus comprising: means for receiving motion reports from the plurality of user equipment, wherein the motion reports indicate a current location, a current direction of motion, and a current speed of the moving vehicles, wherein the motion reports are received from at least one of: user equipment currently using the base station for wireless communication; user equipment currently within the zone served by the base station, but not using the base station for wireless communication; and/or user equipment currently using at least one neighbouring base station to the base station for wireless communication; means for determining, based on the motion reports received by the means for receiving and on locations of the base station and of the at least one neighbouring base station, a configuration for the zone served by the base station; and means for transmitting the configuration for the zone served by the base station to the base station for application by the base station.

Figure 2:
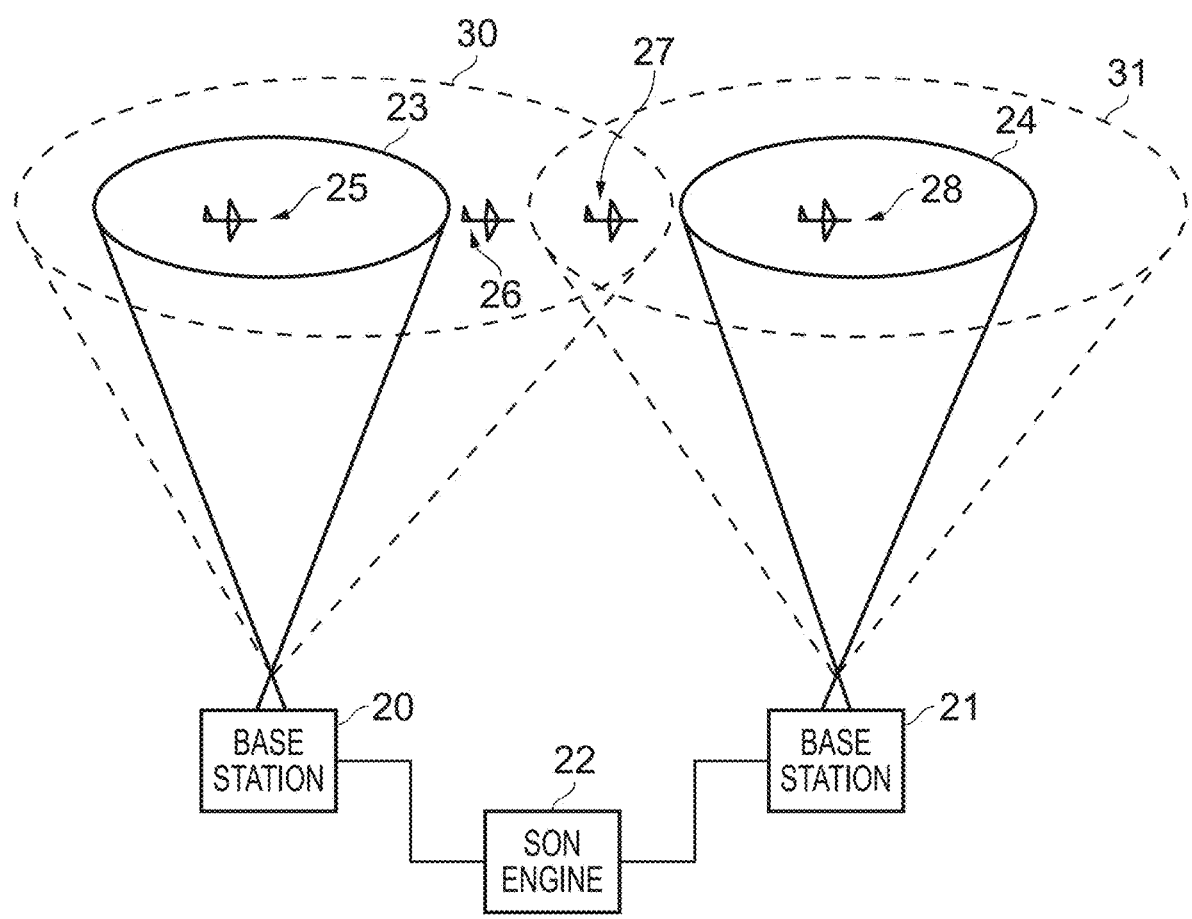
Figure 3:
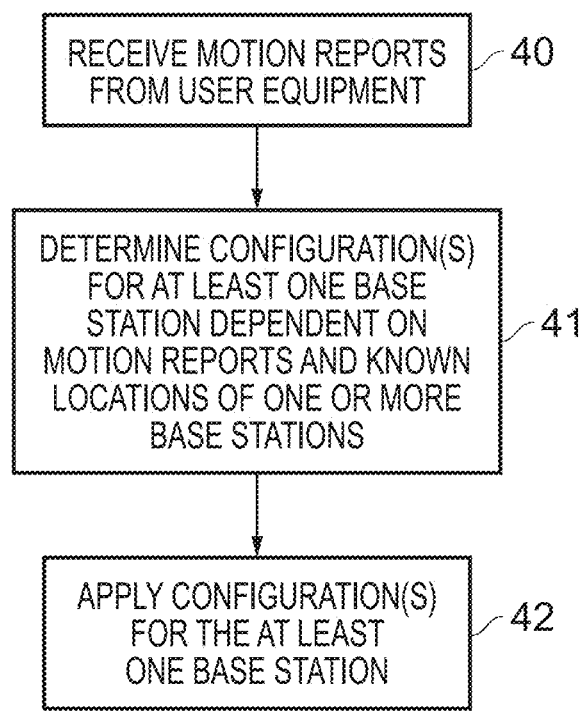
Figure 4:
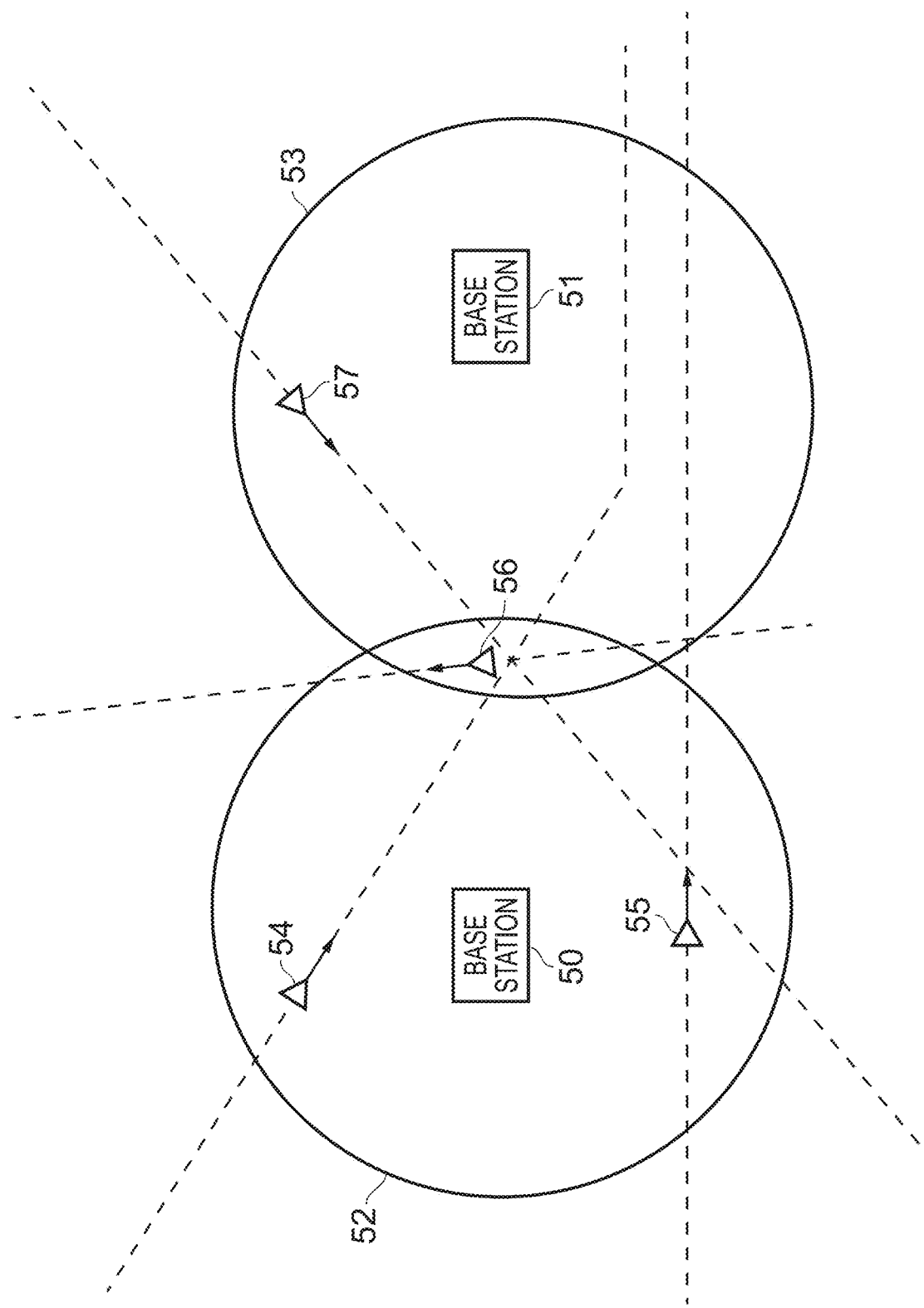
Figure 6:
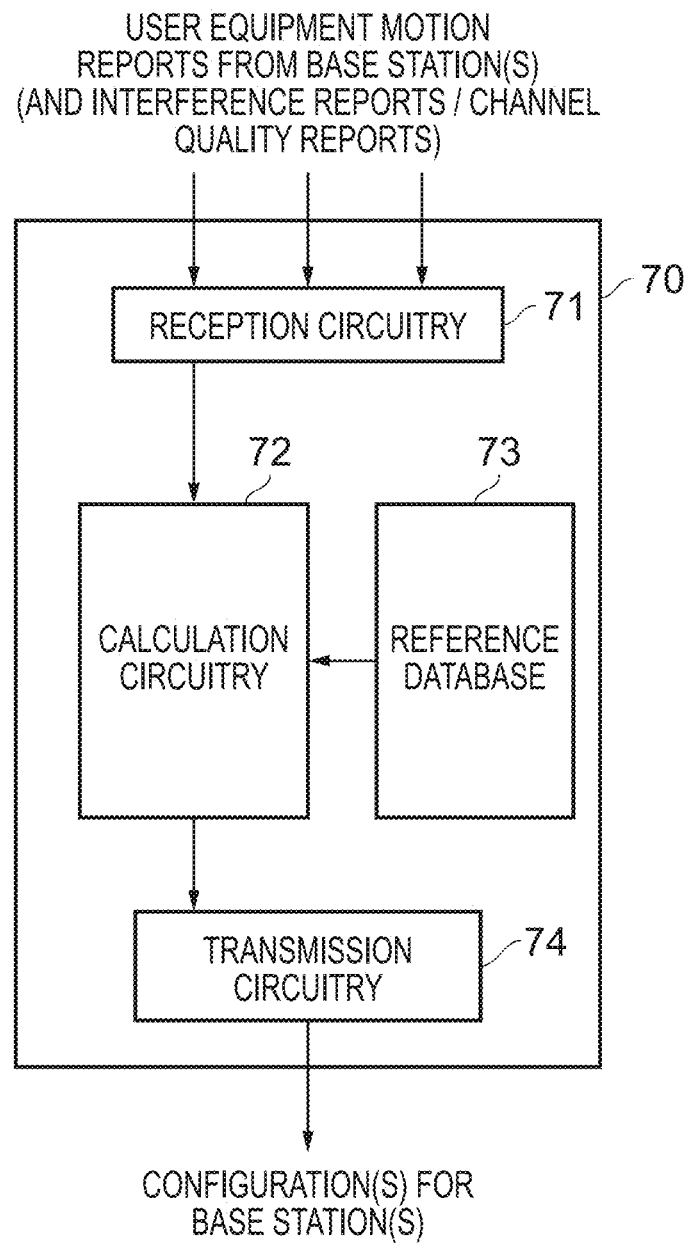
Figure 7:
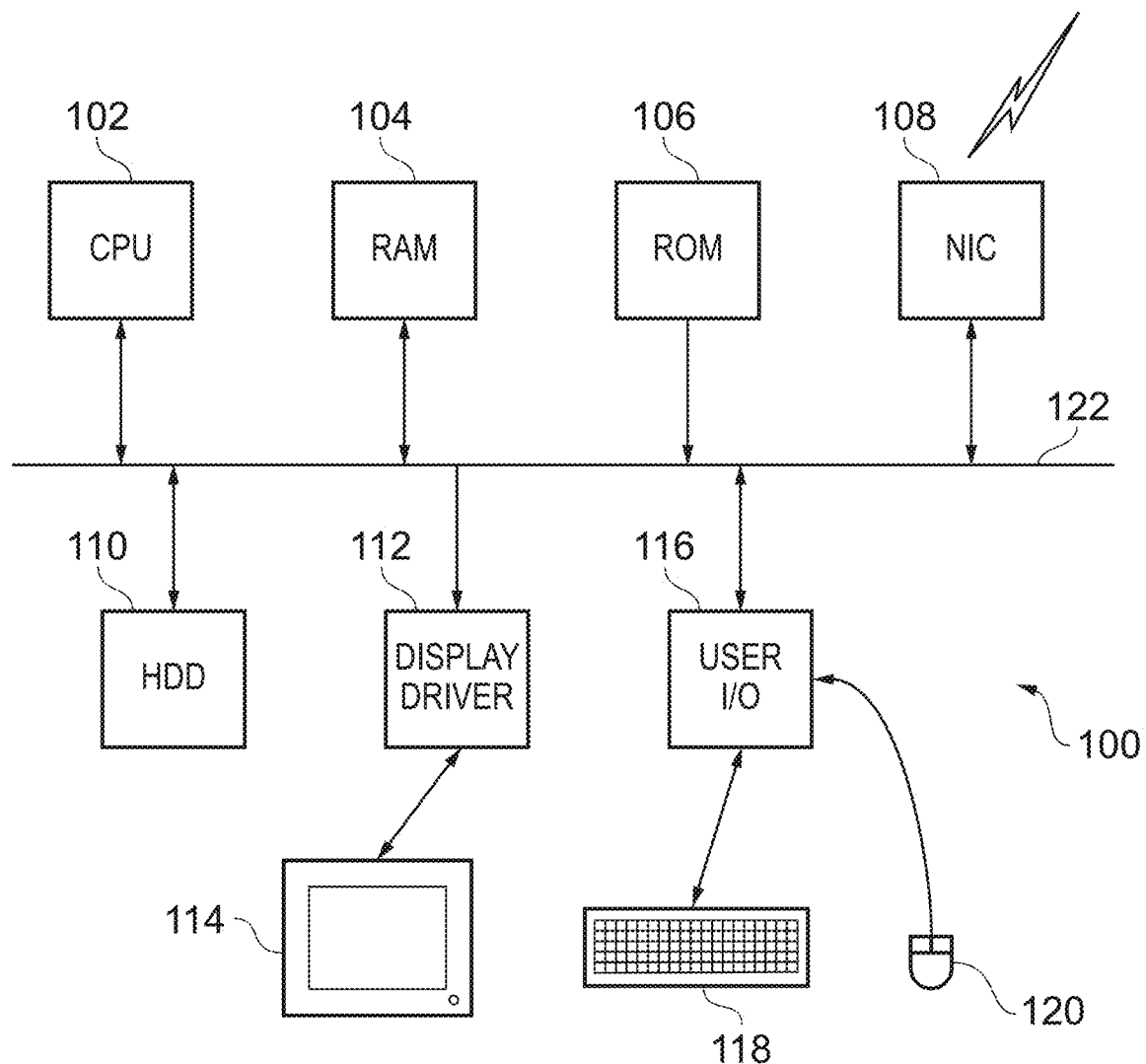
Figure 8:
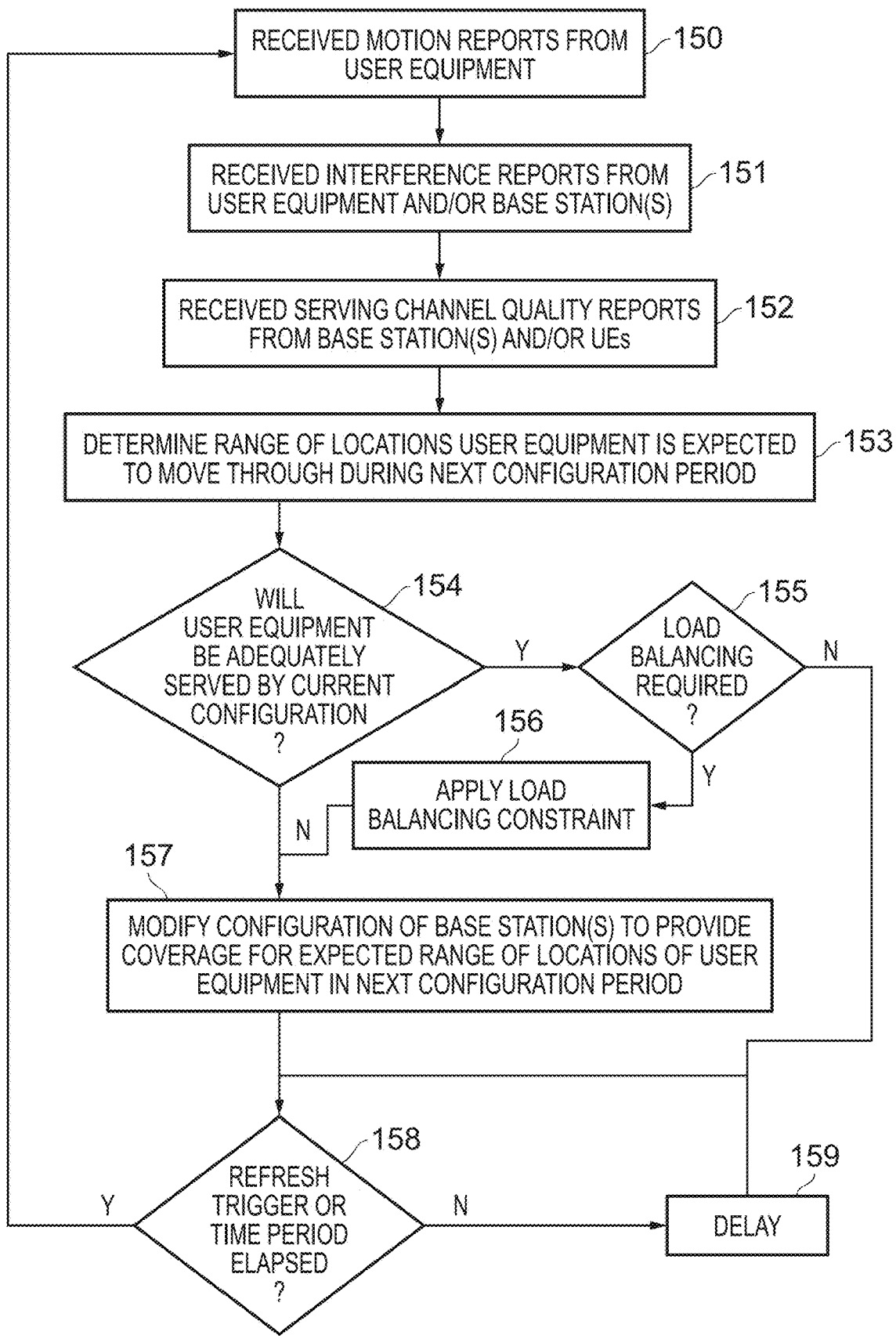
Figure 9:
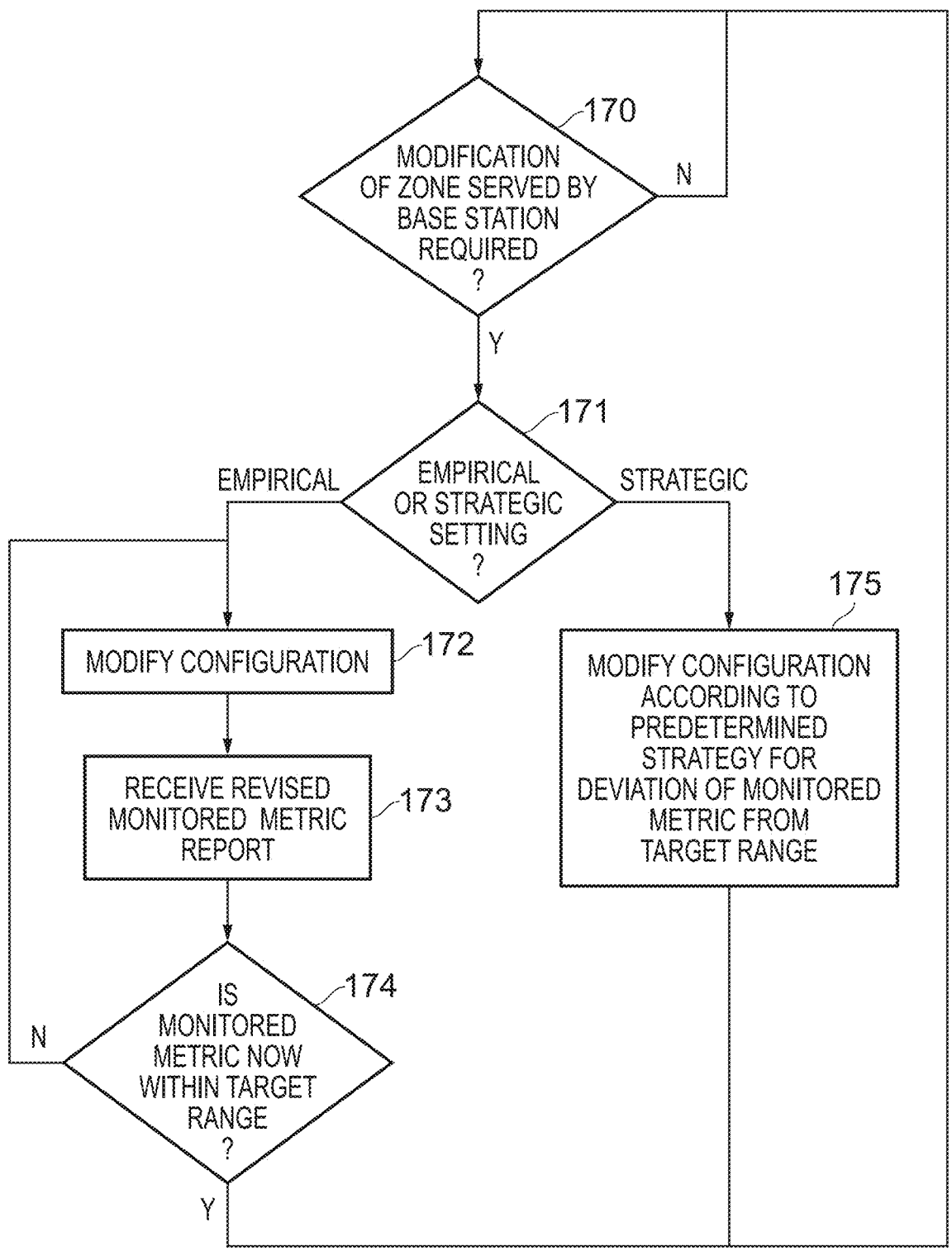

The present techniques will be described further, by way of example only, with reference to embodiments thereof as illustrated in the accompanying drawings, to be read in conjunction with the following description, in which:

FIG. 1 schematically illustrates two-way wireless communication taking place between a fixed, land-based base station and user equipment located in a moving vehicle which in the illustrated example embodiment is in an aircraft;

FIG. 2 schematically illustrates a portion of a wireless network provided by two base stations with the zones that each serves being variable in one example embodiment;

FIG. 3 is a flow diagram showing a sequence of steps which are taken according to the method of one example embodiment;

FIG. 4 schematically illustrates overlapping zones served by two neighbouring base stations and four aircraft housing user equipment communicating with those base stations in one example embodiment, where the current direction of motion and planned flight paths of those aircraft are also shown in one example embodiment;

FIGS. 5A-5D schematically illustrate the zone served by a base station in various configurations, as the overall transmission power, the beam pattern, and the number of active antennas of the base station is varied in an example embodiment;

FIG. 6 schematically illustrates a Self-Organising Network (SON) engine which is configured to configure the zone served by at least one base station in a wireless network in one example embodiment;

FIG. 7 schematically illustrates a general-purpose computer which may be used in example embodiments;

FIG. 8 is a flow diagram showing a sequence of steps which are taken to configure the zone served by at least one base station in an example embodiment; and FIG. 9 is a flow diagram showing a sequence of steps which are taken when modifying the zone served by a base station in an example embodiment.

In one example herein there is a method of configuring the zone served by a base station providing wireless communication for a plurality of user equipment located in moving vehicles, the method comprising: receiving motion reports from the plurality of user equipment, wherein the motion reports indicate a current location, a current direction of motion, and a current speed of the moving vehicles, wherein the motion reports are received from at least one of: user equipment currently using the base station for wireless communication; user equipment currently within the zone served by the base station, but not using the base station for wireless communication; and/or user equipment currently using at least one neighbouring base station to the base station for wireless communication; determining, based on the motion reports and on locations of the base station and of the at least one neighbouring base station, a configuration for the zone served by the base station; and applying the configuration for the zone served by the base station.

The present techniques are concerned with the configuration of the zone served by a base station providing wireless communication for user equipment, in particular where that user equipment is located in moving vehicles. In the more general case where the user equipment connecting to a wireless network is mobile, but not associated with any particular location of the user equipment, i.e. it may be in a portable mobile telephone, it may form part of a device having a fixed location, or it form part of a device which is often moving (e.g. a car), then some account may be taken of the movement of the plurality of user equipment connecting to the wireless network. For example LTE (in particular within the 3GPP release 9 capability or beyond) a self-optimisation capability (mobility robustness optimisation) is specified according to which it is sought to provide support for detecting and helping correct against connection failures caused by intra-LTE mobility and unnecessary inter-system handovers to other radio access technologies. According to this approach the particular issues which it is aims to avoid are a) handover between base stations occurring too late, b) handover occurring too early and c) handover to the wrong cell.

However the present techniques are based on the realisation that when the plurality of user equipment connecting to the wireless network is located in moving vehicles this brings a particular set of consequences when seeking to configure the zones served by the base stations providing the wireless network. On the one hand the fact that the plurality of user equipment is located in moving vehicles means that intra-network movement is, by definition, very common and needs to be handled correctly, the more so when those moving vehicles are fast-moving, but on the other hand particularly when compared to user equipment which may be carried by people going about their daily lives, the movement of the moving vehicles can be significantly more predictable, for example because cars are typically constrained to drive along roads, trains are constrained to travel along tracks, and aircraft are typically constrained to follow carefully predefined flight paths. In the light of this, the present techniques comprise receiving motion reports from the user equipment. These motion reports indicate the current location of the user equipment, its current direction of motion, and its current speed. This therefore enables the determination of the zone served by a given base station to be made not only on the basis of the number of instances of user equipment which are currently within the zone served by the base station, but also look ahead (for example over the course of a subsequent predefined period) and taking into account, based on those motion reports, where the plurality of user equipment is expected to be over the course of that timescale. For example the motion report from a given item of user equipment may indicate that the moving vehicle is on its way out of the zone currently served by the base station and some modification of that zone may therefore be appropriate in order to support a seamless provision of wireless communication for that user equipment during the subsequent transition to communication with another base station. Moreover, the present techniques propose that the motion reports may not only be received from user equipment which is currently used in a given base station (for which the configuration of the zone served is currently under consideration), but also may be received from user equipment which is physically within the zone currently served by the base station but is not using the base station for wireless communication, and also may be received from user equipment which is currently using at least one neighbouring base station for wireless communication. Bringing this information together, the movement of the plurality of user equipment in the moving vehicles with respect to the zone served by a given base station can be taken into account, including not only user equipment which is currently being served by that base station, but also user equipment which can be expected to shortly transition into the zone served by the base station. On this basis some modification of the configuration for the zone served by the base station may be appropriate and when such modification is determined, this is then applied to the respective base station in order that wireless communication for the plurality of the user equipment is better supported as that user equipment moves with respect to the base station.

The plurality of user equipment may provide further relevant information in order to allow the configuration of the zone served by the base station to be assessed and modified, and in some embodiments the method further comprises: receiving interference reports from the plurality of user equipment, wherein the interference reports indicate at least one of: a signal strength measurement; a signal-to-noise ratio measurement; and/or a background noise measurement, wherein the determining of the configuration for the zone served by the base station is also based on the interference reports. By further receiving these interference reports the configuration of the zone served by the base station can thus be modified in order to reduce the interference between neighbouring base stations and, allowing for the expected movement of these user equipment in the moving vehicles, the respective zones of the base stations can be modified, such that, particularly in peripheral regions where the zones could overlap, signal strength is improved, signal-to-noise ratios are improved.

The method may be carried out by a variety of devices which in some way participate in the provision of the wireless network. For example a base station may be configured with the capability to carry out the described method either just for its own configuration or indeed also for one or more neighbouring base station(s). However in some embodiments the method is carried out by a self-organising network engine and wherein the motion reports and/or the interference reports are received by the self-organising network engine via the base station and/or the at least one neighbouring base station. One or more instances of the self-organising network engine may therefore be provided and each base station can be associated with a given self organising network engine instance. The self-organising network engine may take a variety of forms, for example being integrated with a base station or being a physically separate and distinct network component.

In some embodiments the method further comprises: receiving serving channel quality reports from at least one of the base station and the at least one neighbouring base station, wherein the serving channel quality reports indicate at least one frequency on which the plurality of user equipment is currently communicating with at least one base station of the base station and the neighbouring base stations, and wherein the determining of the configuration for the zone served by the base station is also based on the serving channel quality reports. Accordingly, the qualities of the channels on which the plurality of user equipment is currently communicating with the base station and/or the neighbouring base station(s) can further be taken into account when determining the configuration of the zone served by the base station, in particular such that interference between neighbouring base station is reduced.

The manner in which the configuration of the zone served by the base station is defined, and hence modified, may take a variety of forms but in some embodiments the configuration for the zone served by the base station comprises at least one of: an overall transmission power of the base station; a beam pattern of at least one antenna of the base station; and/or a number of active antennas of the base station. Each of these characteristics of the configuration of the zone served by the base station may be modified, in particular in order to vary the size and shape of the zone and to take into account the expected movement of the plurality of user equipment based on the motion reports. For example where a given item of user equipment is currently located towards the outer region of the (as currently configured) zone served by the base station, and furthermore the motion report from that item of user equipment indicates that it is heading further away from the centre of that zone, the zone served by that base station can be increased to better support the transition of this item of user equipment from a connection to this base station to subsequent connection with a neighbouring base station. Indeed it could also simply be to prolong the period for which the item of user equipment is served by this base station, when there is no further base station to transition to, such as in an example where the base station is located near to a geographical coast and the moving vehicle is an aircraft heading from land to sea, where eventually no wireless communication with the land-based network will be possible.

As discussed above the moving vehicles may take a variety of forms but in some embodiments the moving vehicles are aircraft and the wireless communication for the plurality of user equipment located in the aircraft is air-to-ground communication. Providing the infrastructure to support wireless communication for user equipment located in aircraft with base stations on the ground makes at least some of the issues described above particularly acute, due to the relatively large distances involved (e.g. between base stations, and between base stations and the aircraft) and the relatively high aircraft speeds involved.

Nevertheless, as mentioned above, the movement of moving vehicles may be particularly predictable in the case of aircraft it has been realised and in some embodiments the motion reports comprise at least a portion of a flight plan for at least one aircraft. Not only can a flight plan indicate where an aircraft is expected to be, its expected heading, its expected airspeed, and so on, but it can also indicate this information for a future time point. Thus in some embodiments the method further comprises receiving intended motion reports for the plurality of user equipment, wherein the intended motion reports comprise at least a portion of a flight plan for the at least one aircraft.

Such a flight plan or flight plan portion may be received from an aircraft itself. However in other examples it may be received from a ground-based source and thus in some embodiments the intended motion reports are received from a terrestrial database. Thus, the present techniques can, for example, make use of existing, publicly-accessible, tracking information databases (such as aviation databases, in the case where the moving vehicle is an aircraft). This ensures that the moving vehicle tracking circuitry is able to determine up-to-date tracking information for the vehicle, without requiring such information to be transmitted by the vehicle. This does not however preclude such information (also) being transmitted by the vehicle itself.

The determination of the configuration for the zone served by the base station may take a variety of forms, but in some embodiments determining the configuration for the zone served by the base station comprises reducing an area of the zone served by the base station. Equally, in other instances determining the configuration for the zone served by the base station comprises increasing an area of the zone served by the base station.

As mentioned above the modification of the configuration for the zone served by the base station can be performed only with respect to that base station itself, as in the above-mentioned example of increasing the zone served by a base station when it is identified that an item of user equipment located in a moving vehicle towards the periphery of the zone is moving further away from the base station, however in some embodiments the method comprises a coordinated determination of determining the configuration for the zone served by the base station in coordination with determining a further configuration for a further zone served by a further base station of the at least one neighbouring base station. For example where an item of user equipment located in a moving vehicle is identified as transitioning from an area generally served by a first base station to an area generally served by a second base station the configuration of the zones served by each respective base station can be modified to support that transition.

Accordingly in some embodiments the coordinated determination is carried out in response to a determination, based on the motion reports and on locations of the base station and of the at least one neighbouring base station, that at least one user equipment of the plurality of user equipment will transition between the zone served by a first base station and a zone served by a second base station within a predetermined time period.

Other factors may also be taken into account when determining the configuration of the zones served by a given base station and its neighbours, which may include seeking to ensure that neighbouring base stations share the burden of providing the wireless communication between them in an appropriate manner. Accordingly, in some embodiments the coordinated determination is carried out in accordance with a predetermined load-balancing procedure according to which the zone served by the base station and the further zone served by a further base station of the at least one neighbouring base station are adjusted in coordination with one another to cause a transfer of traffic load from the base station to the further base station or vice versa. Thus, for example even though a number of items of user equipment may currently be located closer to a first base station than to a second base station, and indeed may not be expected (in the next relevant timeframe) to be located closer to the second base station, the load-balancing procedure may nevertheless determine that it is preferable for at least one of these items of user equipment to transition to communicating with the second base station (assuming that this would still meet relevant quality-of-service definitions), such that the wireless traffic load carried by the respective base stations is better balanced.

The method may be carried out at any appropriate instance (and indeed a user such as a network engineer may even intervene at any time to trigger such a reconfiguration), but alternatively or in addition, the method may be caused to be carried out in response to one or more predefined criteria. Accordingly, in some embodiments the method is carried out in response to elapse of a predetermined refresh period. In some embodiments the method is carried out in response to a predetermined refresh trigger.

The predetermined refresh trigger may take a variety of forms depending on the implementation in order to maintain quality-of-service definitions, but in some embodiments the predetermined refresh trigger comprises at least one of: a determination, based on the motion reports and on locations of the base station and of the at least one neighbouring base station, that at least one user equipment of the plurality of user equipment will transition between the zone served by a first base station and a zone served by a second base station within a predetermined time period; and/or reception of an interference report from the plurality of user equipment which indicates that at least one of a signal strength measurement, a signal-to-noise ratio measurement and/or a background noise measurement is outside a predetermined limit.

Various approaches may be taken to implementing a modification to the configuration for the zone served by the base station. For example, feedback based on a monitored metric may be employed in order to iteratively modify the configuration in order to seek to reach a given modification to that monitored metric. For example, in some embodiments the determining, based on the motion reports and on locations of the base station and of the at least one neighbouring base station, the configuration for the zone served by the base station is carried out according to an empirical iterative procedure wherein a change in a monitored metric dependent on at least one of: handover success rate; a signal strength measurement; a signal-to-noise ratio measurement; and/or a background noise measurement is monitored when the configuration is applied by the base station and when the monitored metric does not thereby reach a predetermined threshold value the method is repeated. Suitably defined iterative steps to the modification of the configuration can therefore be defined (dependent on the particular monitored metric employed) in order to incrementally modify the configuration in order to bring the monitored metric to or beyond the predetermined threshold value. Alternatively a predetermined approach to modifying the configuration of the zone served by the base station may be taken comprising making one or more predetermined modifications to the configuration and accordingly in some embodiments the determining, based on the motion reports and on locations of the base station and of the at least one neighbouring base station, the configuration for the zone served by the base station is carried out according to an predetermined strategy comprising making one or more predetermined modifications to the configuration when at least one of: a signal strength measurement; a signal-to-noise ratio measurement; and/or a background noise measurement is outside a predetermined limit.

In one example herein there is an apparatus for configuring the zone served by a base station providing wireless communication for a plurality of user equipment located in moving vehicles, the apparatus comprising: reception circuitry to receive motion reports from the plurality of user equipment, wherein the motion reports indicate a current location, a current direction of motion, and a current speed of the moving vehicles, wherein the motion reports are received from at least one of: user equipment currently using the base station for wireless communication; user equipment currently within the zone served by the base station, but not using the base station for wireless communication; and/or user equipment currently using at least one neighbouring base station to the base station for wireless communication; calculation circuitry to determine, based on the motion reports received by the reception circuitry and on locations of the base station and of the at least one neighbouring base station, a configuration for the zone served by the base station; and transmission circuitry to transmit the configuration for the zone served by the base station to the base station for application by the base station.

In one example herein there is an apparatus for configuring the zone served by a base station providing wireless communication for a plurality of user equipment located in moving vehicles, the apparatus comprising: means for receiving motion reports from the plurality of user equipment, wherein the motion reports indicate a current location, a current direction of motion, and a current speed of the moving vehicles, wherein the motion reports are received from at least one of: user equipment currently using the base station for wireless communication; user equipment currently within the zone served by the base station, but not using the base station for wireless communication; and/or user equipment currently using at least one neighbouring base station to the base station for wireless communication; means for determining, based on the motion reports received by the means for receiving and on locations of the base station and of the at least one neighbouring base station, a configuration for the zone served by the base station; and means for transmitting the configuration for the zone served by the base station to the base station for application by the base station.

Some particular embodiments are now described with reference to the figures.

FIG. 1 schematically illustrates a base station 10 which forms part of a network of such base stations spread across geographical area to provide a wireless network. In particular the wireless network in this example is provided for user equipment which is mounted in or on aircraft which pass through that geographical area. FIG. 1 schematically illustrates an item of user equipment 11 forming part of an aircraft 12 which is in wireless communication with the base station. Accordingly, as illustrated in the figure, two directional communication paths are set up namely a downlink connection from the base station 10 to the user equipment 11 and an uplink communication path from the user equipment 11 to the base station 10. For the avoidance of doubt it is worth noting that the terminology here can at first glance appear counter-intuitive, where the user equipment 11 is typically at a considerable height above the ground but the direction inherent in the labels "downlink" and "uplink" are to be understood in the sense of the data transfer, i.e. where the user equipment 11 allows a user in the aircraft 12 to "download" data from and conversely to "upload" data to the internet via the base station 10. FIG. 1 also schematically illustrates a self-organising network (SON) engine 13 which is connected to the base station 10 and is configured to specify the configuration of the zone served by the base station, as will be described in more detail with reference to the figures which follow.

FIG. 2 schematically illustrates two base stations 20 and 21, which together provide part of the wireless network to which user equipment located in or on aircraft can connect. Control over the configuration of the zone served by each base station is administered by the SON engine 22 connected to each of the base stations. FIG. 2 schematically illustrates a first configuration of the zone served by base station 20 (full line 23) and a first configuration of the zone served by the second base station 21 (full line 24). Also shown in the figure are four positions of an aircraft 25, 26, 27, and 28. A second configuration of the zone served by the base station 20 is shown by the dashed line 30 and a second configuration of the zone served by the base station 21 is shown by the dashed line 31. It is to be noted that the second zones 30 and 31 cover a notably greater area than those provided by the first configurations 23 and 24. Accordingly, as an aircraft travels through the area generally served by the base stations 20 and 21 it can be seen that at position 25 the aircraft will be within the zone served by the base station 20 according to either the first configuration 23 or the second configuration 30. Once it reaches the position 26 or 27 it would be outside the zone served by the base station according to the first configuration 23, but would be within the zone served by the base station in the second configuration 30. Conversely from the point of view of the base station 21 at position 27 the aircraft would be within the zone 31 served by the base station 21 according to its second configuration 31, but outside the zone 24 served by the base station 21 according to its first configuration. Once the aircraft reaches position 28 it would be within the zone 24 served by the base station 20 according to its first configuration and within the zone 31 served by the base station 21 according to its second configuration. Nevertheless it should be noted that the SON engine 22 is not arranged to cause the base station 20 and the base station 21 to remain permanently in their second configurations to provide the wider coverage of the zones 30 and 31, since there may be other drawbacks to this arrangement, such as additional interference between the wireless communication provided by the base station 20 and the base station 21, the greater power consumption for the respective base stations 20 and 21 to provide the larger zones of coverage, and further considerations which may not be apparent from the necessarily simplified illustration of FIG. 2 relating to the respective signal strengths, signal-to-noise ratios, and intra-system interference characteristics (observed by other network elements not illustrated in FIG. 2) associated with the respective larger zones relative to the smaller zones. Furthermore, although only two base stations and two correspondingly provided zones served by the respective base stations are shown, there will typically be further neighbouring base stations surrounding each of the base stations 20 and 21 which may also be an influence on and affected by the respective configurations. Moreover the SON engine 22 does not provide a static configuration for each of the base stations 20 and 21 in terms of the zones that each serves, but in the context of providing wireless connectivity for user equipment in aircraft passing through the region generally covered by the base stations 20 and 21, the SON engine 22 takes into account various factors, including the motion of an aircraft passing through this space. In order to do this the SON engine 22 receives motion reports from aircraft passing through the region generally served by the base stations 20 and 21, where these motion reports indicate the current location, the current direction of motion, and the current speed of the aircraft sending the report. Accordingly, from these motion reports the SON engine 22 is provided with information not only about the current positions of the aircraft, but also with information which enables it to predict where a given aircraft will be within a given subsequent timeframe. Moreover, these motion reports may be received from aircraft which are currently connected to a given base station, but may also be received from aircraft within the zone served by that base station but not using the base station for wireless communication (e.g. are using a neighbouring base station for wireless communication) and these motion reports may further be received from aircraft which are currently using at least one neighbouring base station for wireless communication (i.e. may or may not be within the zone currently served by the base station under consideration). To take just one example, when considering the configuration for the zones served by the base station 21, the SON engine 22 may therefore receive a motion report from an aircraft at position 28 (i.e. within the zone 24 currently served by the base station 21 and currently using the base station 21 for wireless communication), it may receive a motion report from an aircraft at position 27 when the base station 21 is providing the zone 31 for wireless communication, but when the aircraft at position 27 is currently connected for wireless communication with the base station 20, and further the base station 21 may receive a motion report relating to an aircraft at position 25, when the base station 20 is configured to provide the zone 23 and the aircraft is connected to the base station 20 for wireless communication. Thus for example, the SON engine 20 can determine an appropriate configuration for the zone served by the base station 21 for a next timeframe, recognising that, for example, within that timeframe aircraft which are currently at positions 26 and 27 will reach positions better served by the base station 21, although only when it has a configuration to provide a zone similar to the zone 31, but that, say, the aircraft currently at position 25 will not reach a position which can be covered by the base station 21 within the same timeframe.

FIG. 3 is a flow diagram which shows a sequence of steps which are taken according to the method of some embodiments, which may for example be carried out by SON engines such as those shown in FIGS. 1 and 2 (items 13 and 22 respectively). At step 40, motion reports are received from user equipment and then at step 41 a configuration is determined for at least one base station in dependence on those motion reports and based on the known locations of one or more base stations. It will be recognised that although motion reports are received from the user equipment located in moving vehicles (such as the aircraft of FIGS. 1 and 2), the locations of the ground based base stations are inherently static and therefore upon their installation their respective positions are determined and do not change. The device which carries out the method of FIG. 3 (e.g. a SON engine) can therefore for example have access to these known locations from a database. Finally once the configuration of one or more base stations has been determined, this or these configurations are conveyed to the base station(s) and applied.

FIG. 4 schematically illustrates two base stations 50 and 51 and the respective zones 52 and 53 currently served by each. Also illustrated are four aircraft (triangles) which are currently travelling through one or other of the zones served by the two base stations. The arrow attached to each aircraft indicates the current vector, i.e. direction and speed, of the respective aircraft. Each aircraft generates motion reports which it transmits as part of its wireless communication with the base station which it is currently connected, and which indicate the current location, the current direction of motion, and the current speed of the aircraft. These motion reports may therefore be gathered by a SON engine in communication with the base stations and arranged to determine the configuration for the zone served by each of the base stations 50 and 51, although in some embodiments one of the base stations 50 and 51 itself may be arranged to perform this determination. Also shown in FIG. 4 are dashed lines indicating the planned flight path of each of respective aircraft. Generally, these extrapolate relatively linearly from the motion vectors of each aircraft, although it should be particularly noted that the illustrated flight path for the aircraft 54 makes a substantial deviation within the zone served by the base station 51. These flight paths, in the embodiment schematically illustrated by FIG. 4, also form part of the motion reports transmitted from each aircraft. It should be noted however that where aircraft flight paths are typically predetermined and static, they may be transmitted considerably less frequently than the other information forming part of the motion report (location, direction, and speed). Indeed in some embodiments flight path information may be available to the device performing the determination of the appropriate configuration for the zones served by the base stations, but may be derived from an entirely different source, such as a public database of aircraft, flight numbers, and flight plans, such that when a particular aircraft identifies itself as part of its motion report this identification is sufficient for a lookup in a flight path database to be performed. With reference to the particular example of the flight path of the aircraft 54, it is to be noted that the planned change of direction of the aircraft within the zone served by the base station 51 means that (if the configuration of the zone 53 does not change) that the aircraft 54 will remain within the zone 53 for longer than it otherwise would have done if it had continued on an entirely linear path.

Figure 5A:
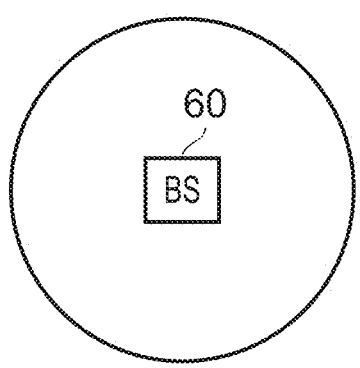
Figure 5B:
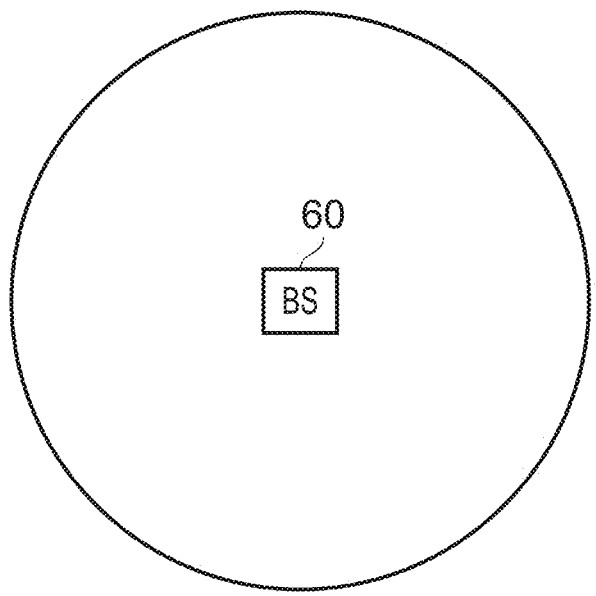
Figure 5C:
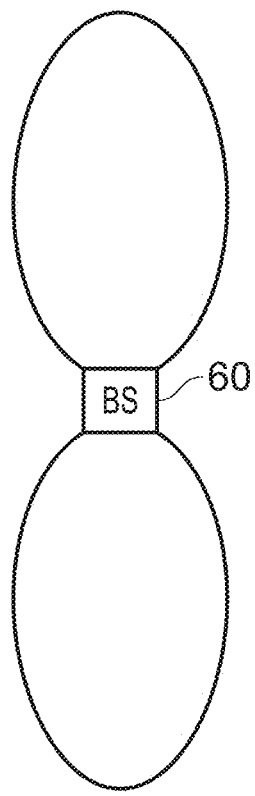
Figure 5D:
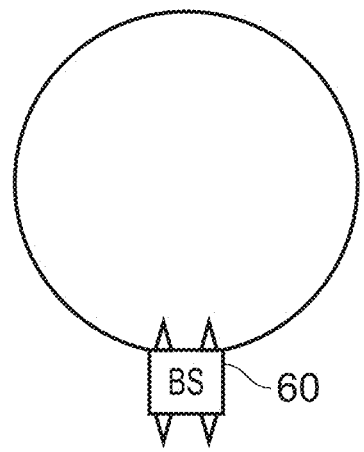

FIGS. 5A to 5B schematically illustrate a base station 60, showing how the zone served by the base stations may be modified in various ways. It is important to note here that the "zone" served is not synonymous with an individual beam pattern. Typically a serving zone is covered by multiple beams, and these beams are not necessarily all active at any one time instant. It is the aggregate beam coverage that is equivalent here to the "zone served". A first configuration of the zone served by the example base station 60 is shown in FIG. 5A. A first modification to the configuration of the zone served is then shown in FIG. 5B, in which the overall transmission power of the base station has been increased, resulting in a larger area of the zone served. FIG. 5C shows a configuration according to which the underlying beam pattern of the antennas of the base station has been changed, such that the relatively circular (in this plan view) shape of the zone served by the base station 60 in the configurations of FIGS. 5A and 5B, is modified to a two lobed shaped zone served in FIG. 5C. The configuration of the zone served in FIG. 5C is thus strongly directional, with strong coverage within the lobes, but rather weak coverage in the direction is perpendicular to the extension of the lobes. Finally in the configuration shown in FIG. 5D, for which the base station 60 is shown schematically to comprise four antennas, only two of these are active, whilst two are inactive. This results in a zone served (based on one or more underlying beam patterns), in this example configuration, which essentially only extends to one side of the base station. Accordingly, depending on the locations of the moving vehicles hosting the user equipment which is wirelessly connecting to this base station, and on the motion reports received from the user equipment, configurations of the zones served by the base station such as those shown in FIGS. 5A-5D can be selected between in order to provide coverage in those regions where the moving vehicles not only currently are but in anticipation of the expected locations of those moving vehicles. It should be noted that the examples of FIGS. 5A-5D necessarily only show a very limited range of possible variations, and generally by varying the overall transmission power of the base station, selecting between (combinations of) multiple possible beam patterns for each of the antenna of the base station, and/or the number of active/inactive antennas of the base station (techniques with which one of ordinary skill in the art is familiar) a great range of configurations of the zone served by the base station may be selected between.

FIG. 6 schematically illustrates an apparatus for carrying out the present techniques according to an example embodiment. The apparatus 70 shown may for example be a SON engine, such as one of those discussed above with reference to the preceding figures. The apparatus 70 comprises reception circuitry 71, by which one or more user equipment motion reports are received via the base station(s) with which that user equipment is wirelessly communicating. Interference reports and/or channel quality reports are also received by the reception circuitry 71. These motion reports (and other reports) are passed from the reception circuitry 71 to the calculation circuitry 72, which is configured to determine a configuration for the zone served by at least one base station. To do this the calculation circuitry also receives information from a reference database 73 in which the locations of the relevant base station(s) are stored. Combining this information, and in some embodiments making use of further information which may be received by the same route such as interference reports from the user equipment, the calculation circuitry 72 determines the configuration(s). A configuration thus determined is passed to the transmission circuitry 74, from where it is transmitted to the relevant base station for application.

In some embodiments the determination of the configuration for the zone served by one or more base stations may be carried out on a computing device of a more generic configuration and such a device 100 is schematically illustrated in FIG. 7. The general purpose computing device 100 includes a central processing unit 102, a random access memory 104, a read-only memory 106, a network interface card 108, a hard disk drive 110, a display driver 112 and monitor 114, and a user input/output circuit 116 with a keyboard 118 and mouse 120, all connected via a common bus 122. In operation the central processing unit 102 will execute computer program instructions that may be stored in one or more of the random access memory 104, the read-only memory 106 and the hard disk drive 110 or dynamically downloaded via the network interface card 108. The results of the processing performed may be displayed to a user via the display driver 112 and the monitor 114. User inputs for controlling the operation of the general purpose computer 100 may be received via the user input output circuit 116 from the keyboard 118 or the mouse 120. It will be appreciated that the computer program could be written in a variety of different computer languages. The computer program may be stored and distributed on a recording medium or dynamically downloaded to the general purpose computer 100. When operating under control of an appropriate computer program, the general purpose computing device 100 can perform the above described techniques of base station zone configuration determination and can be considered to form an apparatus for performing the above described techniques. The architecture of the general purpose computing device 100 could vary considerably and FIG. 7 is only one example.

Alternatively, the above-described techniques may be implemented in a more distributed fashion, wherein the general purpose computing device 100 illustrated in FIG. 7 may be expanded and/or replaced by an infrastructure comprising components implemented on separate physical devices, the separate physical devices sharing the processing required to carry out these techniques. Such separate physical devices may be physically proximate to one another, or may even be located at entirely different physical locations. In some configurations such an infrastructure is termed a 'cloud computing' arrangement.

FIG. 8 is a flow diagram showing a sequence of steps which are taken according to the method of one example embodiment. This method may for example be carried out by a centralised SON engine, such as that shown in FIG. 6. The flow can be considered to begin at step 150, where motion reports have been received from user equipment. Then at step 151 interference reports have also been received from user equipment 151 and/or one or more base stations. User equipment may provide downlink (DL) interference reports and base stations may provide uplink (UL) interference reports. Note that the UL/DL interference reports may be significantly different. For example it is anticipated that up to 30 dB increase of the interference in the DL (relative to thermal noise) may arise, whereas in the UL much less is anticipated, this being perhaps up to 20 dB interference relative to thermal noise. Furthermore at step 152 serving channel quality reports have been received from one or more base stations and/or from the user equipment. Then at step 153 on the basis of the motion reports received from the user equipment a determination is made as to the range of locations in which the user equipment can be expected to move through during the period for which this configuration determination is to be applied. On the basis of that determination at step 153, it is then determined at step 154 whether the user equipment will be adequately served by the current configuration of a base station. If it will then the flow proceeds to step 154 where it is further determined if load balancing is nonetheless required between at least two base stations. If no load balancing is required then the flow proceeds to step 158 where it is determined if a refresh trigger has occurred or if a predetermined time period for refresh has elapsed. If one of these has occurred then the flow returns to step 150 and the steps of the method once again carried out. If however neither of these has occurred then the flow proceeds to step 159 for a predetermined delay before the flow returns to step 158. Returning to a consideration of step 155, when it is determined that load balancing is required then this is applied at step 156 and handover between base stations for certain selected user equipment is triggered. The flow then proceeds to step 157, since during load balancing a reconfiguration may also be needed. Finally, returning to a consideration of step 154, when it is determined that the configuration of the zone served by at least one base station must be modified in order to adequately serve the user equipment, then the flow proceeds to step 157, where on the basis of the motion reports, interference reports, and serving channel quality reports received, new configurations of the zones served by one or more base stations are modified in order to provide the required coverage that the expected range of locations of the user equipment over the next configuration period. The flow then proceeds to step 158.

FIG. 9 is a flow diagram showing a sequence of steps which are taken according to the method of one example embodiment. The flow can be considered to begin at step 170 which is determined whether modification of the zone served by base station is required. If it is not then the flow loops upon itself at step 170 until such modification is required (for example as is required when the "No" path is taken from step 154 in FIG. 8). However when such modification is required then the flow proceeds to step 171. Here two different paths may be taking depending on whether the modification is configured according to an empirical or a strategic setting. For an empirical setting the flow proceeds to step 172 where a modification to the configuration is made and subsequently at step 173 a report of a monitored metric is received, where this monitored metric is expected to change as a result of the configuration modification. It is then determined at step 174 if the monitored metric is now within a target range. If it is not then the flow returns to step 172 for a further modification to be made. The loop of steps 172, 173, and 174 can thus be iteratively followed until the monitored metric reaches the target range. Then the flow returns to step 170. Returning to a consideration of step 171, when a strategic approach to the modification of the configuration is set, then then the flow proceeds to step 175 where the configuration is modified according to a predetermined strategy in dependence on the deviation of a monitored metric from its target range. The flow then returns to step 170.

In brief overall summary, methods and apparatuses for configuring the zone served by a base station providing wireless communication for a plurality of user equipment located in moving vehicles are disclosed. Motion reports are received from the user equipment, indicating a current location, a current direction of motion, and a current speed of the moving vehicles. The motion reports are received from at least one of: user equipment currently using the base station for wireless communication; user equipment currently within the zone served by the base station, but not using the base station for wireless communication; and/or user equipment currently using at least one neighbouring base station to the base station for wireless communication. A configuration for the zone served by the base station is then determined, based on the motion reports and on locations of the base station and of the at least one neighbouring base station. The configuration for the zone served by the base station is then applied to the base station.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments have been described in detail herein with reference to the accompanying drawings, it is to be understood that the invention is not limited to those precise embodiments, and that various changes, additions and modifications can be effected therein by one skilled in the art without departing from the scope of the invention as defined by the appended claims. For example, various combinations of the features of the dependent claims could be made with the features of the independent claims without departing from the scope of the present invention.

The invention claimed is:

1. A method of configuring the zone served by a base station providing wireless communication for a plurality of user equipment located in moving vehicles, the method comprising:

receiving motion reports from the plurality of user equipment, wherein the motion reports indicate a current location, a current direction of motion, and a current speed of the moving vehicles, wherein the motion reports are received from at least one of:

user equipment currently using the base station for wireless communication;
user equipment currently within the zone served by the base station, but not using the base station for wireless communication; and/or
user equipment currently using at least one neighbouring base station to the base station for wireless communication;
determining, based on the motion reports and on locations of the base station and of the at least one neighbouring base station, a configuration for the zone served by the base station; and
applying the configuration for the zone served by the base station,
wherein the moving vehicles are aircraft and the wireless communication for the plurality of user equipment located in the aircraft is air-to-ground communication.

2. The method as claimed in claim 1, further comprising:
receiving interference reports from the plurality of user equipment, wherein the interference reports indicate at least one of:
a signal strength measurement;
a signal-to-noise ratio measurement; and/or
a background noise measurement,
wherein the determining of the configuration for the zone served by the base station is also based on the interference reports.

3. The method as claimed in claim 1, wherein the method is carried out by a self-organising network engine and wherein the motion reports and/or the interference reports are received by the self-organising network engine via the base station and/or the at least one neighbouring base station.

4. The method as claimed in claim 1, further comprising:
receiving serving channel quality reports from at least one of the base station and the at least one neighbouring base station, wherein the serving channel quality reports indicate at least one frequency on which the plurality of user equipment is currently communicating with at least one base station of the base station and the neighbouring base stations, and
wherein the determining of the configuration for the zone served by the base station is also based on the serving channel quality reports.

5. The method as claimed in claim 1, wherein the configuration for the zone served by the base station comprises at least one of:
an overall transmission power of the base station;
a beam pattern of at least one antenna of the base station; and/or
a number of active antennas of the base station.

6. The method as claimed in claim 1, wherein the motion reports comprise at least a portion of a flight plan for at least one aircraft.

7. The method as claimed in claim 1, further comprising receiving intended motion reports for the plurality of user equipment, wherein the intended motion reports comprise at least a portion of a flight plan for the at least one aircraft.

8. The method as claimed in claim 7, wherein the intended motion reports are received from a terrestrial database.

9. The method as claimed in claim 1, wherein determining the configuration for the zone served by the base station comprises reducing an area of the zone served by the base station.

10. A method of configuring the zone served by a base station providing wireless communication for a plurality of user equipment located in moving vehicles, the method comprising:
receiving motion reports from the plurality of user equipment, wherein the motion reports indicate a current location, a current direction of motion, and a current speed of the moving vehicles, wherein the motion reports are received from at least one of:
user equipment currently using the base station for wireless communication;
user equipment currently within the zone served by the base station, but not using the base station for wireless communication; and/or
user equipment currently using at least one neighbouring base station to the base station for wireless communication;
determining, based on the motion reports and on locations of the base station and of the at least one neighbouring base station, a configuration for the zone served by the base station; and
applying the configuration for the zone served by the base station wherein determining the configuration for the zone served by the base station, comprises increasing an area of the zone served by the base station.

11. A method of configuring the zone served by a base station providing wireless communication for a plurality of user equipment located in moving vehicles, the method comprising:
receiving motion reports from the plurality of user equipment, wherein the motion reports indicate a current location, a current direction of motion, and a current speed of the moving vehicles, wherein the motion reports are received from at least one of:
user equipment currently using the base station for wireless communication;
user equipment currently within the zone served by the base station, but not using the base station for wireless communication; and/or
user equipment currently using at least one neighbouring base station to the base station for wireless communication;
determining, based on the motion reports and on locations of the base station and of the at least one neighbouring base station, a configuration for the zone served by the base station; and
applying the configuration for the zone served by the base station further comprising a coordinated determination of determining the configuration for the zone served by the base station in coordination with determining a further configuration for a further zone served by a further base station of the at least one neighbouring base station.

12. The method as claimed in claim 11, wherein the coordinated determination is carried out in response to a determination, based on the motion reports and on locations of the base station and of the at least one neighbouring base station, that at least one user equipment of the plurality of user equipment will transition between the zone served by a first base station and a zone served by a second base station within a predetermined time period.

13. The method as claimed in claim 11, wherein the coordinated determination is carried out in accordance with a predetermined load-balancing procedure according to which the zone served by the base station and the further zone served by a further base station of the at least one neighbouring base station are adjusted in coordination with one another to cause a transfer of traffic load from the base station to the further base station or vice versa.

14. A method of configuring the zone served by a base station providing wireless communication for a plurality of user equipment located in moving vehicles, the method comprising:
receiving motion reports from the plurality of user equipment, wherein the motion reports indicate a current location, a current direction of motion, and a current speed of the moving vehicles, wherein the motion reports are received from at least one of:
user equipment currently using the base station for wireless communication;
user equipment currently within the zone served by the base station, but not using the base station for wireless communication; and/or
user equipment currently using at least one neighbouring base station to the base station for wireless communication;
determining, based on the motion reports and on locations of the base station and of the at least one neighbouring base station, a configuration for the zone served by the base station; and
applying the configuration for the zone served by the base station, wherein the method is carried out in response to elapse of a predetermined refresh period.

15. A method of configuring the zone served by a base station providing wireless communication for a plurality of user equipment located in moving vehicles, the method comprising:
receiving motion reports from the plurality of user equipment, wherein the motion reports indicate a current location, a current direction of motion, and a current speed of the moving vehicles, wherein the motion reports are received from at least one of:
user equipment currently using the base station for wireless communication;
user equipment currently within the zone served by the base station, but not using the base station for wireless communication; and/or
user equipment currently using at least one neighbouring base station to the base station for wireless communication;
determining, based on the motion reports and on locations of the base station and of the at least one neighbouring base station, a configuration for the zone served by the base station; and
applying the configuration for the zone served by the base station, wherein the method is carried out in response to a predetermined refresh trigger.

16. The method as claimed in claim 15, wherein the predetermined refresh trigger comprises at least one of:
a determination, based on the motion reports and on locations of the base station and of the at least one neighbouring base station, that at least one user equipment of the plurality of user equipment will transition between the zone served by a first base station and a zone served by a second base station within a predetermined time period; and/or
reception of an interference report from the plurality of user equipment which indicates that at least one of a signal strength measurement, a signal-to-noise ratio measurement and/or a background noise measurement is outside a predetermined limit.

17. The method as claimed in claim 1, wherein the determining, based on the motion reports and on locations of the base station and of the at least one neighbouring base station, the configuration for the zone served by the base station is carried out according to an empirical iterative procedure wherein a change in a monitored metric dependent on at least one of:
handover success rate;
a signal strength measurement;
a signal-to-noise ratio measurement; and/or
a background noise measurement is monitored when the configuration is applied by the base station and when the monitored metric does not thereby reach a predetermined threshold value the method is repeated.

18. The method as claimed in claim 1, wherein the determining, based on the motion reports and on locations of the base station and of the at least one neighbouring base station, the configuration for the zone served by the base station is carried out according to a predetermined strategy comprising making one or more predetermined modifications to the configuration when at least one of:
a signal strength measurement;
a signal-to-noise ratio measurement; and/or
a background noise measurement is outside a predetermined limit.

19. An apparatus for configuring the zone served by a base station providing wireless communication for a plurality of user equipment located in moving vehicles, the apparatus comprising:
reception circuitry to receive motion reports from the plurality of user equipment, wherein the motion reports indicate a current location, a current direction of motion, and a current speed of the moving vehicles, wherein the motion reports are received from at least one of:
user equipment currently using the base station for wireless communication;
user equipment currently within the zone served by the base station, but not using the base station for wireless communication; and/or
user equipment currently using at least one neighbouring base station to the base station for wireless communication;
calculation circuitry to determine, based on the motion reports received by the reception circuitry and on locations of the base station and of the at least one neighbouring base station, a configuration for the zone served by the base station; and
transmission circuitry to transmit the configuration for the zone served by the base station to the base station for application by the base station,
wherein the moving vehicles are aircraft and the wireless communication for the plurality of user equipment located in the aircraft is air-to-ground communication.

20. An apparatus for configuring the zone served by a base station providing wireless communication for a plurality of user equipment located in moving vehicles, the apparatus comprising:
means for receiving motion reports from the plurality of user equipment, wherein the motion reports indicate a current location, a current direction of motion, and a current speed of the moving vehicles, wherein the motion reports are received from at least one of:
user equipment currently using the base station for wireless communication;
user equipment currently within the zone served by the base station, but not using the base station for wireless communication; and/or user equipment currently using at least one neighbouring base station to the base station for wireless communication;

means for determining, based on the motion reports received by the means for receiving and on locations of the base station and of the at least one neighbouring base station, a configuration for the zone served by the base station; and means for transmitting the configuration for the zone served by the base station to the base station for application by the base station, wherein the moving vehicles are aircraft and the wireless communication for the plurality of user equipment located in the aircraft is air-to-ground communication.

* * * * *